US011429490B1

United States Patent
Sayyed et al.

(10) Patent No.: US 11,429,490 B1
(45) Date of Patent: Aug. 30, 2022

(54) SYSTEMS AND METHODS FOR MANAGEMENT CONTROLLER INSTRUMENTED AND VERIFIED PRE-EFI BIOS RECOVERY VIA NETWORK

(71) Applicant: Dell Products L.P., Round Rock, TX (US)

(72) Inventors: Ibrahim Sayyed, Georgetown, TX (US); Sumanth Vidyadhara, Bangalore (IN); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/391,502

(22) Filed: Aug. 2, 2021

(51) Int. Cl.
*G06F 11/14* (2006.01)
*G06F 11/07* (2006.01)
*G06F 9/4401* (2018.01)

(52) U.S. Cl.
CPC ........ *G06F 11/1417* (2013.01); *G06F 9/4406* (2013.01); *G06F 11/0772* (2013.01); *G06F 11/1435* (2013.01)

(58) Field of Classification Search
CPC .............. G06F 11/1417; G06F 9/4406; G06F 11/0772; G06F 11/1435
See application file for complete search history.

(56) References Cited

U.S. PATENT DOCUMENTS

| 7,484,084 | B1 * | 1/2009 | Ranaweera | G06F 8/656 713/1 |
| 7,698,547 | B1 * | 4/2010 | Polyudov | G06F 9/44521 713/2 |
| 7,849,454 | B2 * | 12/2010 | Lambert | G06F 11/0793 717/168 |
| 10,534,620 | B2 * | 1/2020 | Samuel | G06F 13/4282 |
| 2002/0147941 | A1 * | 10/2002 | Gentile | G06F 11/1417 714/36 |
| 2005/0228888 | A1 * | 10/2005 | Mihm | G06F 8/65 709/227 |
| 2005/0229173 | A1 * | 10/2005 | Mihm | G06F 8/65 717/171 |
| 2006/0143431 | A1 * | 6/2006 | Rothman | G06F 11/1417 714/E11.133 |
| 2006/0143700 | A1 * | 6/2006 | Herrmann | H04L 63/166 726/14 |
| 2008/0046546 | A1 * | 2/2008 | Parmar | G06F 11/3006 714/E11.202 |

(Continued)

FOREIGN PATENT DOCUMENTS

WO    WO-03030434 A2 *  4/2003  .......... G06F 9/4416

*Primary Examiner* — Matthew M Kim
*Assistant Examiner* — Indranil Chowdhury
(74) *Attorney, Agent, or Firm* — Jackson Walker L.L.P.

(57) ABSTRACT

An information handling system may include a processor, a basic input/output system (BIOS) comprising a program of instructions executable by the processor and configured to cause the processor to initialize components of the information handling system; and a management controller communicatively coupled to the processor and configured to, during a pre-Extensible Firmware Interface Initialization (PEI) phase of the BIOS, operate as a network proxy for the BIOS to allow the BIOS to communicate data via an out-of-band network interface of the management controller.

18 Claims, 2 Drawing Sheets

(56) References Cited

U.S. PATENT DOCUMENTS

| | | | |
|---|---|---|---|
| 2008/0256525 A1* | 10/2008 | Ellsworth | G06F 11/1433 717/168 |
| 2009/0006859 A1* | 1/2009 | Zimmer | G06F 21/575 713/186 |
| 2012/0110379 A1* | 5/2012 | Shao | G06F 11/1417 714/15 |
| 2014/0208133 A1* | 7/2014 | Gopal | G06F 11/2294 713/310 |
| 2015/0149815 A1* | 5/2015 | Maity | G06F 11/0706 714/5.11 |
| 2017/0010899 A1* | 1/2017 | Dasar | G06F 8/654 |
| 2017/0068548 A1* | 3/2017 | Dasar | G06F 9/4401 |
| 2018/0039546 A1* | 2/2018 | Lambert | G06F 11/2635 |
| 2019/0286436 A1* | 9/2019 | Liu | G06F 8/654 |
| 2020/0042710 A1* | 2/2020 | Liu | G06F 21/575 |
| 2020/0104141 A1* | 4/2020 | Balakrishnan | G06F 9/4406 |
| 2020/0218527 A1* | 7/2020 | Ganesan | G06F 8/65 |
| 2020/0249960 A1* | 8/2020 | Suryanarayana | G06F 9/4416 |
| 2020/0250017 A1* | 8/2020 | Samuel | G06F 9/542 |
| 2020/0310774 A1* | 10/2020 | Zhu | G06F 9/4401 |
| 2021/0240832 A1* | 8/2021 | Malluru | G06F 21/602 |
| 2021/0286530 A1* | 9/2021 | Suryanarayana | G06F 3/0637 |
| 2021/0374005 A1* | 12/2021 | Muthaiyan | G06F 21/57 |

* cited by examiner

SYSTEMS AND METHODS FOR MANAGEMENT CONTROLLER INSTRUMENTED AND VERIFIED PRE-EFI BIOS RECOVERY VIA NETWORK

TECHNICAL FIELD

The present disclosure relates in general to information handling systems, and more specifically to healing an information handling system from operating system stop error code crashes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key feature of many information handling systems is the basic input/output system (BIOS). A BIOS may comprise a system, device, or apparatus configured to identify, test, and/or initialize information handling resources of an information handling system and may comprise boot firmware configured to be the first code executed by a processor when an information handling system is booted and/or powered on.

At times, it may be desirable to perform recovery of BIOS code via a network. However, existing approaches of performing BIOS recovery via a network have disadvantages.

For example, existing pre-boot network fetch technologies such as BIOSConnect-served service operating system recovery and BIOSConnect-served firmware over the air update only work when an information handling system is in a BIOS functional state. These features only work when a BIOS is able to complete its power-on/self-test (POST) and may require a full networking stack to be enabled to perform network boot.

As another example, existing approaches for BIOS recovery are local. Using existing approaches, a recovery image needs to be present on an information handling system through recovery.

As a further example, existing approaches are susceptible to malicious attack. To illustrate, when a primary boot block for BIOS is corrupted, an enclosure controller may attempt to boot to a secondary boot block. Hackers have exploited this feature in order to cause a processor to fetch instructions from an alternate boot block that includes malicious code.

SUMMARY

In accordance with the teachings of the present disclosure, the disadvantages and problems associated with existing approaches for BIOS recovery have been reduced or eliminated.

In accordance with embodiments of the present disclosure, an information handling system may include a processor, a basic input/output system (BIOS) comprising a program of instructions executable by the processor and configured to cause the processor to initialize components of the information handling system; and a management controller communicatively coupled to the processor and configured to, during a pre-Extensible Firmware Interface Initialization (PEI) phase of the BIOS, operate as a network proxy for the BIOS to allow the BIOS to communicate data via an out-of-band network interface of the management controller.

In accordance with these and other embodiments of the present disclosure, a method may include, in an information handling system comprising a processor, a basic input/output system (BIOS) comprising a program of instructions executable by the processor and configured to cause the processor to initialize components of the information handling system, and a management controller communicatively coupled to the processor, during a pre-Extensible Firmware Interface Initialization (PEI) phase of the BIOS, operating the management controller as a network proxy for the BIOS to allow the BIOS to communicate data via an out-of-band network interface of the management controller.

In accordance with these and other embodiments of the present disclosure, an article of manufacture may include a computer readable medium and computer-executable instructions carried on the computer readable medium, the instructions readable by a processing device, the instructions, when read and executed, for causing the processing device to, in an information handling system comprising a processor, a basic input/output system (BIOS) comprising a program of instructions executable by the processor and configured to cause the processor to initialize components of the information handling system, and a management controller communicatively coupled to the processor, during a pre-Extensible Firmware Interface Initialization (PEI) phase of the BIOS, operate the management controller as a network proxy for the BIOS to allow the BIOS to communicate data via an out-of-band network interface of the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
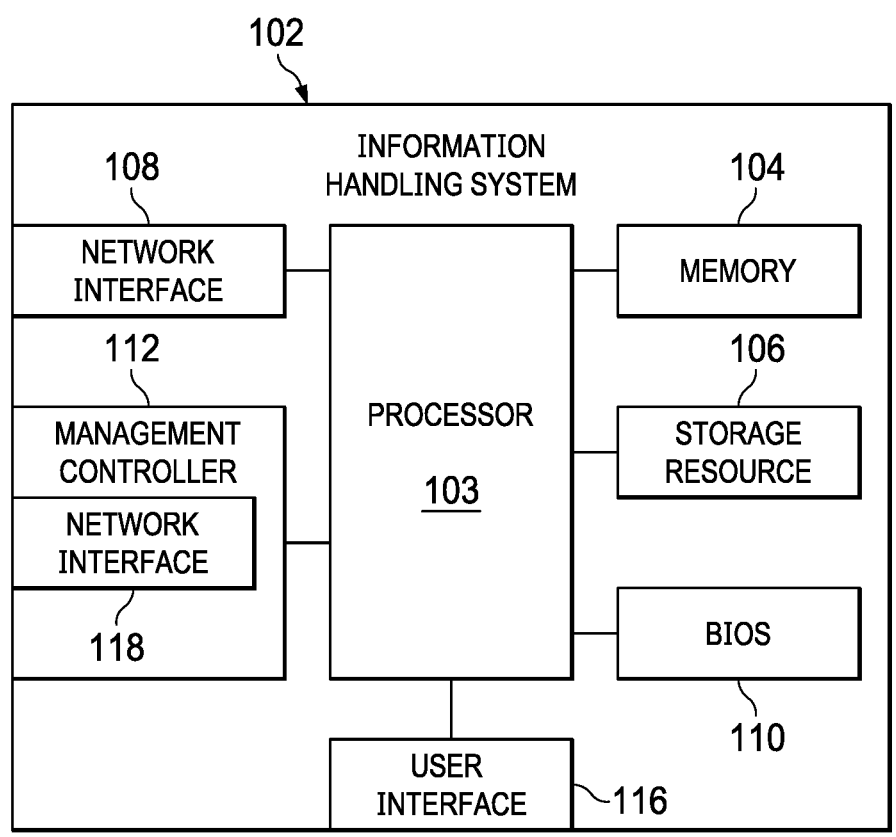
FIG. 1 illustrates a block diagram of an example information handling system, in accordance with certain embodiments of the present disclosure.
Figure 2:
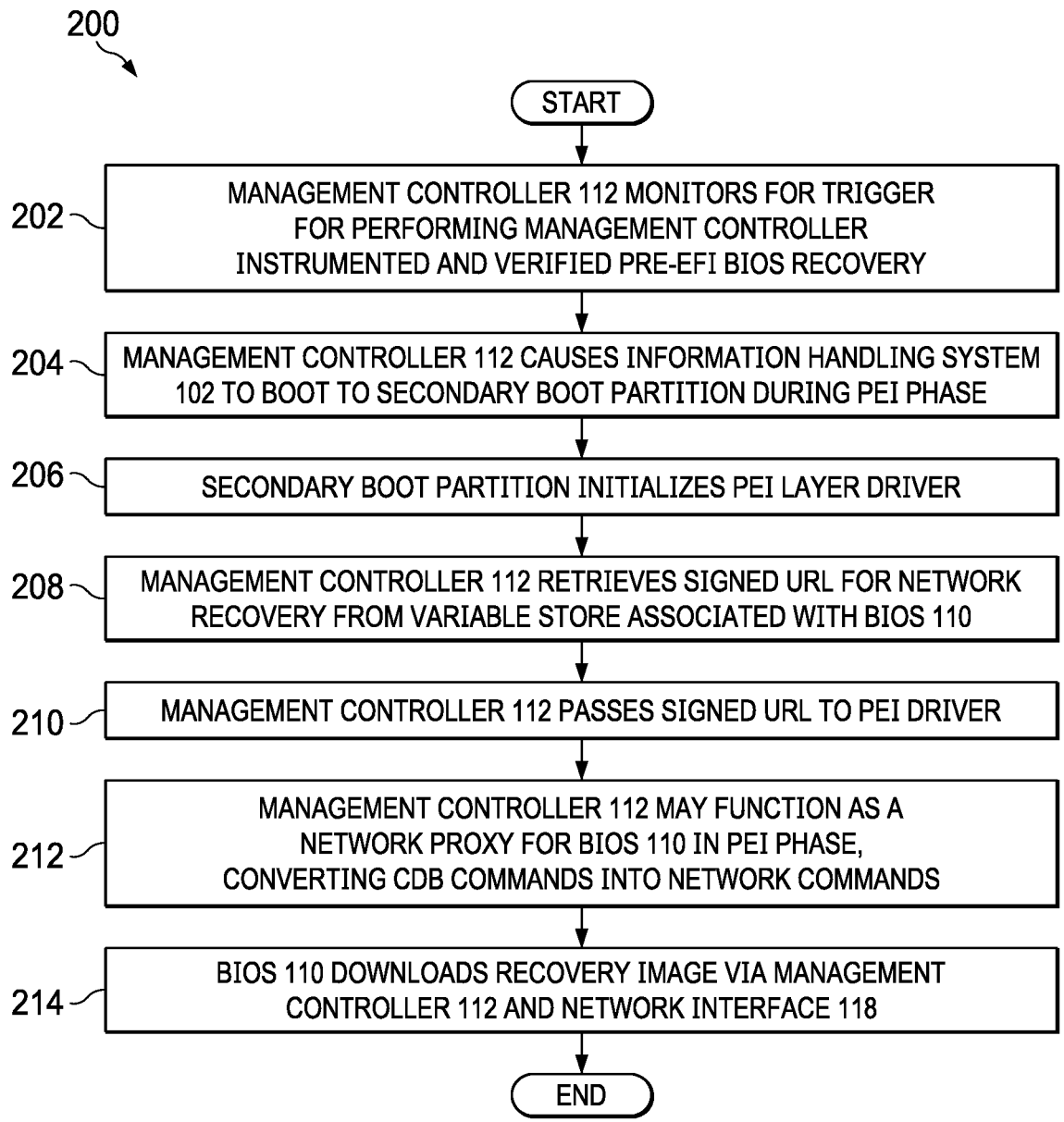
FIG. 2 illustrates a flow chart of an example method for management controller instrumented and verified pre-Extensible Firmware Interface (EFI) BIOS recovery via a network, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102 adapted for preboot healing of platform issues that cause operating system stop error code crashes, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, a management controller 112 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. As its name suggests, storage resource 106 is intended to reside internal to a chassis or other enclosure comprising information handling system 102 and not be readily accessible without opening such chassis or other enclosure.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Management controller 112 may comprise any system, device, or apparatus configured to provide out-of-band management facilities for management of information handling system 102. Such management may be made by management controller 112 even if information handling system 102 is powered off or powered to a standby state. Management controller 112 may include an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

Network interface 118 may comprise any suitable system, apparatus, or device operable to serve as an interface between management controller 112 and one or more other information handling systems. Network interface 118 may enable management controller 112 to communicate using any suitable transmission protocol and/or standard. In these and other embodiments, network interface 118 may comprise a network interface card, or "NIC."

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

FIG. 2 illustrates a flow chart of an example method 200 for management controller instrumented and verified pre-EFI BIOS recovery via a network, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may monitor for a trigger for performing management controller instrumented and verified pre-EFI BIOS recovery. Such trigger may include detecting an indicator of attack using telemetry information of BIOS 110 (e.g., a boot deviation, disabling of Secure Boot, tampering of Secure Boot keys, boot to a SafeBIOS bootable image, failed verification of boot sanctity, results of a security scan on BIOS recovery files, chassis intrusion, unsuccessful password attempts, etc.), failure of the last attempted BIOS recovery, and/or another suitable trigger. In some embodiments, such indicator of an attack may be measured by BIOSIQ telemetry.

At step 204, responsive to the trigger, management controller 112 may cause information handling system 102 to boot to a secondary boot partition during the pre-EFI Initialization (PEI) phase of the boot process with special flags to initialize the PEI phase. In some embodiments, such secondary boot partition/recovery path may include a PEI network firmware volume (e.g., Pre-EFI Initialization Network Firmware Volume or PEI NW FV).

At step 206, the secondary boot partition may initialize a PEI layer driver (e.g., Universal Network Device Interface PEI layer driver). At step 208, management controller 112 may retrieve a signed uniform resource locator (URL) for network recovery from a variable store (e.g., UEFI variable store) associated with BIOS 110 and verify the URL (e.g., by applying a key to the signed URL). At step 210, management controller 112 may pass the signed URL to the PEI driver.

At step 212, management controller 112 may begin to function as a network proxy for BIOS 110 in the PEI phase, converting command descriptor block (CDB) commands received via a management controller-BIOS interface into network commands for sending and receiving data over network interface 118. Accordingly, at step 214, BIOS 110 may download a recovery image via management controller 112 and network interface 118 and prepare information handling system 102 to perform a BIOS update. After completion of step 214, method 200 may end, and information handling system 102 may reboot with the BIOS update applied.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a basic input/output system (BIOS) comprising a program of instructions executable by the processor and configured to cause the processor to initialize components of the information handling system; and
   a management controller communicatively coupled to the processor and configured to, during a pre-Extensible Firmware Interface Initialization (PEI) phase of the BIOS, operate as a network proxy for the BIOS to allow the BIOS to communicate data via an out-of-band network interface of the management controller.

2. The information handling system of claim 1, wherein the data comprises a BIOS recovery image downloaded from a network communicatively coupled to the out-of-band network interface of the management controller.

3. The information handling system of claim 1, wherein the management controller is further configured to:
   determine if a trigger for performing management controller instrumented BIOS recovery via a network has occurred; and
   operate as the network proxy for the BIOS in response to the trigger occurring.

4. The information handling system of claim 3, wherein the trigger includes failure of an attempted BIOS recovery.

5. The information handling system of claim 3, wherein determining if the trigger has occurred is based on analysis of telemetry information of the BIOS.

6. The information handling system of claim 1, wherein the management controller is further configured to:
   retrieve a signed uniform resource locator for communication of data to and from the BIOS via the out-of-band network interface of the management controller; and
   verify a signature of the signed uniform resource locator.

7. A method comprising, in an information handling system comprising a processor, a basic input/output system (BIOS) comprising a program of instructions executable by the processor and configured to cause the processor to initialize components of the information handling system, and a management controller communicatively coupled to the processor:
   during a pre-Extensible Firmware Interface Initialization (PEI) phase of the BIOS, operating the management controller as a network proxy for the BIOS to allow the BIOS to communicate data via an out-of-band network interface of the management controller.

8. The method of claim 7, wherein the data comprises a BIOS recovery image downloaded from a network communicatively coupled to the out-of-band network interface of the management controller.

9. The method of claim 7, further comprising:
   determining if a trigger for performing management controller instrumented BIOS recovery via a network has occurred; and
   operating the management controller as the network proxy for the BIOS in response to the trigger occurring.

10. The method of claim 9, wherein the trigger includes failure of an attempted BIOS recovery.

11. The method of claim 9, wherein determining if the trigger has occurred is based on analysis of telemetry information of the BIOS.

12. The method of claim 7, further comprising:
   retrieving by the management controller a signed uniform resource locator for communication of data to and from the BIOS via the out-of-band network interface of the management controller; and
   verifying, by the management controller, a signature of the signed uniform resource locator.

13. An article of manufacture comprising:
   a non-transitory computer readable medium; and
   computer-executable instructions carried on the non-transitory computer readable medium, the instructions readable by a processing device, the instructions, when read and executed, for causing the processing device to, in an information handling system comprising a processor, a basic input/output system (BIOS) comprising a program of instructions executable by the processor and configured to cause the processor to initialize components of the information handling system, and a management controller communicatively coupled to the processor:

during a pre-Extensible Firmware Interface Initialization (PEI) phase of the BIOS, operate the management controller as a network proxy for the BIOS to avow the BIOS to communicate data via an out-of-band network interface of the management controller.

14. The article of claim 13, wherein the data comprises a BIOS recovery image downloaded from a network communicatively coupled to the out-of-band network interface of the management controller.

15. The article of claim 13, further comprising:
determining if a trigger for performing management controller instrumented BIOS recovery via a network has occurred; and
operating the management controller as the network proxy for the BIOS in response to the trigger occurring.

16. The article of claim 15, wherein the trigger includes failure of an attempted BIOS recovery.

17. The article of claim 15, wherein determining if the trigger has occurred is based on analysis of telemetry information of the BIOS.

18. The article of claim 13, further comprising:
retrieving by the management controller a signed uniform resource locator for communication of data to and from the BIOS via the out-of-band network interface of the management controller; and
verifying, by the management controller, a signature of the signed uniform resource locator.

* * * * *

UNITED STATES PATENT AND TRADEMARK OFFICE
CERTIFICATE OF CORRECTION

PATENT NO. : 11,429,490 B1
APPLICATION NO. : 17/391502
DATED : August 30, 2022
INVENTOR(S) : Sayyed et al.

Page 1 of 1

It is certified that error appears in the above-identified patent and that said Letters Patent is hereby corrected as shown below:

In the Claims

1. In Column 9, Line 3, Claim 13, delete "to avow the" and insert -- to allow the --, therefor.

Signed and Sealed this
Fifth Day of December, 2023

Katherine Kelly Vidal
*Director of the United States Patent and Trademark Office*